United States Patent [19]
Dunaj

[11] Patent Number: 6,105,491
[45] Date of Patent: Aug. 22, 2000

[54] GUARD FOR PRESS BRAKE

[76] Inventor: Ricardo D. Dunaj, 8300 NW. 36 Ct., Coral Springs, Fla. 33065

[21] Appl. No.: 08/718,848

[22] Filed: Sep. 24, 1996

[51] Int. Cl.⁷ .................................................. B30B 15/00
[52] U.S. Cl. ............................ 100/99; 100/53; 200/61.42
[58] Field of Search ................. 100/53, 99; 74/614–616; 200/61.42

[56] References Cited

U.S. PATENT DOCUMENTS

| 3,866,004 | 2/1975 | Nawrocki | 100/53 |
| 3,969,955 | 7/1976 | Markham | 100/53 |
| 4,060,160 | 11/1977 | Lieber | 100/53 |

FOREIGN PATENT DOCUMENTS

| 6-15493 | 1/1994 | Japan | 100/53 |

*Primary Examiner*—Stephen F. Gerrity
*Attorney, Agent, or Firm*—Charles E. Baxley, Esq.

[57] ABSTRACT

A guard includes a housing which is mounted on the movable ram of a press brake. The housing supports a pivotally and slideably mounted guard plate and a fluorescent light bulb. The guard plate is positioned in front of the male and female dies of the press brake and prevents accidental contact with the dies. When a work piece is inserted between the dies, the guard plate is pushed upward and the motion of the guard plate actuates a switch which turns the fluorescent light bulb on. When the workpiece is removed, the guard plate returns to the original position under the influence of gravity and the fluorescent light bulb is turned off.

15 Claims, 4 Drawing Sheets

GUARD FOR PRESS BRAKE

BACKGROUND OF THE INVENTION

The present invention relates generally to the field of guards for machinery and, more particularly, to a guard for a press brake.

THE PRIOR ART

The prior art related to guards for machinery includes the following U.S. Pat. Nos.: 3,731,543; 3,988,980; 4,162,647; 4,552,494; 4,884,927; 5,036,969; and 5,479,837.

U.S. Pat. No. 3,731,543 to Jahnke et al shows a safety guard for a power press in which a block of sponge rubber defines a cavity within which tool and die elements are contained.

U.S. Pat. No. 3,988,980 to Walker shows a safety guard structure in which a guard member is supported on rollers at two upper points and is supported on a vertically extending rod located at a single lower point.

U.S. Pat. No. 4,162,647 to Aslen shows a guard for a milling machine in which a plurality of mounting bars extend away from a tool area with each one supporting a set of mounting blocks. A pair of support rods extend from opposite sides of each mounting block and are attached to support blocks. A pair of support blocks each support one of a pair of guard panels.

U.S. Pat. No. 4,552,494 to Wix shows a collapsible safety shield for use with a vertical drill press which includes interconnected telescoping hollow cylinders with a top cylinder connected to a non-rotating vertically moving drill housing member while a lower cylinder is suspended from the top cylinder. One side of the lower cylinder is removed for gaining access to the interior thereof for adjusting the drill chuck and replacing drill bits.

U.S. Pat. No. 4,884,927 to Menker shows a shield for a machine tool in which a guard sheet is attached to an elongated stem which is clamped to the machine tool. A clamp which is adapted for clamping onto a vertical threaded rod is mounted on the elongated stem.

U.S. Pat. No. 5,056,969 to Nerland et al shows a shield for attachment to a machine tool in which a bracket arm supports a shield for pivotal motion. A magnet which is attached to the bracket arm is used to allow attachment of the bracket to a machine tool.

U.S. Pat. No. 5,479,837 to Kyle shows a guard for channel bed presses in which a vertical guard is attached to the channel bed by two spring loaded adjustable members which hook onto and interlock with the channel bed.

Despite the development of various guards for machinery shown in the above prior art patents, there remains a need for a guard for a press brake which can be used to protect the operator from the crush hazard created by the press brake and still allow the operator to maintain a cost-effective rate of production. This need has become even more critical since extensive regulations covering safety in the work areas have been put in place.

OBJECTS AND SUMMARY OF THE INVENTION

It is an object of the present invention to provide a guard for a press brake which effectively prevents unwanted, accidental contact with the male or female dies of the press brake.

Another object of the present invention is to provide a guard for a press brake which can be easily mounted on a press brake without a need for machining of any kind.

Another object of the present invention is to provide a guard for a press brake which provides a visual alarm during operation of the press brake.

Another object of the present invention is to provide a guard for a press brake which provides an audible alarm during operation of the press brake.

Another object of the present invention is to provide a guard for a press brake which provides a clear plastic guard plate to facilitate monitoring the operation of the press brake and the brake dies.

Another object of the present invention is to provide a guard for a press brake which can be operated by the insertion of a workpiece between the male and female dies of a press brake.

Still another object of the present invention is to provide a guard for a press brake which is composed of a relatively small number of relatively simple parts resulting in reliable long-term operation.

The foregoing and other objects and advantages of the present invention will appear more clearly hereinafter.

In accordance with the present invention there is provided a guard for a press brake which includes a housing which is mounted on the movable ram of a press brake by an electromagnetic unit. The housing supports a fluorescent light bulb and, alternatively, the housing may also support an audible alarm.

A pair of swivel balls are pivotally mounted on the housing. The swivel balls include groove portions which support a guard plate. The guard plate is positioned in front of male and female dies of the press brake and prevents accidental contact with the male and female dies.

When an operator inserts a work piece between the male and female dies, the workpiece pushes the guard plate upwardly, causing the guard plate to slide upwardly in the groove portions. The guard plate can also pivot on the swivel balls. The motion of the guard plate actuates a switch which is mounted on the housing, thereby turning both the fluorescent light bulb and the audible alarm on. The fluorescent light bulb and the audible alarm attract and maintain the attention of the operator, thereby increasing the operator's level of awareness and improving the safety level of the operation. When the workpiece is removed, the guard plate returns to the original position under the influence of gravity and the visible and audible alarms are turned off.

DESCRIPTION OF THE DRAWINGS

Other important objects and advantages of the invention will be apparent from the following detailed description, taken in connection with the accompanying drawings, in which.

DETAILED DESCRIPTION OF THE INVENTION

Figure 1:
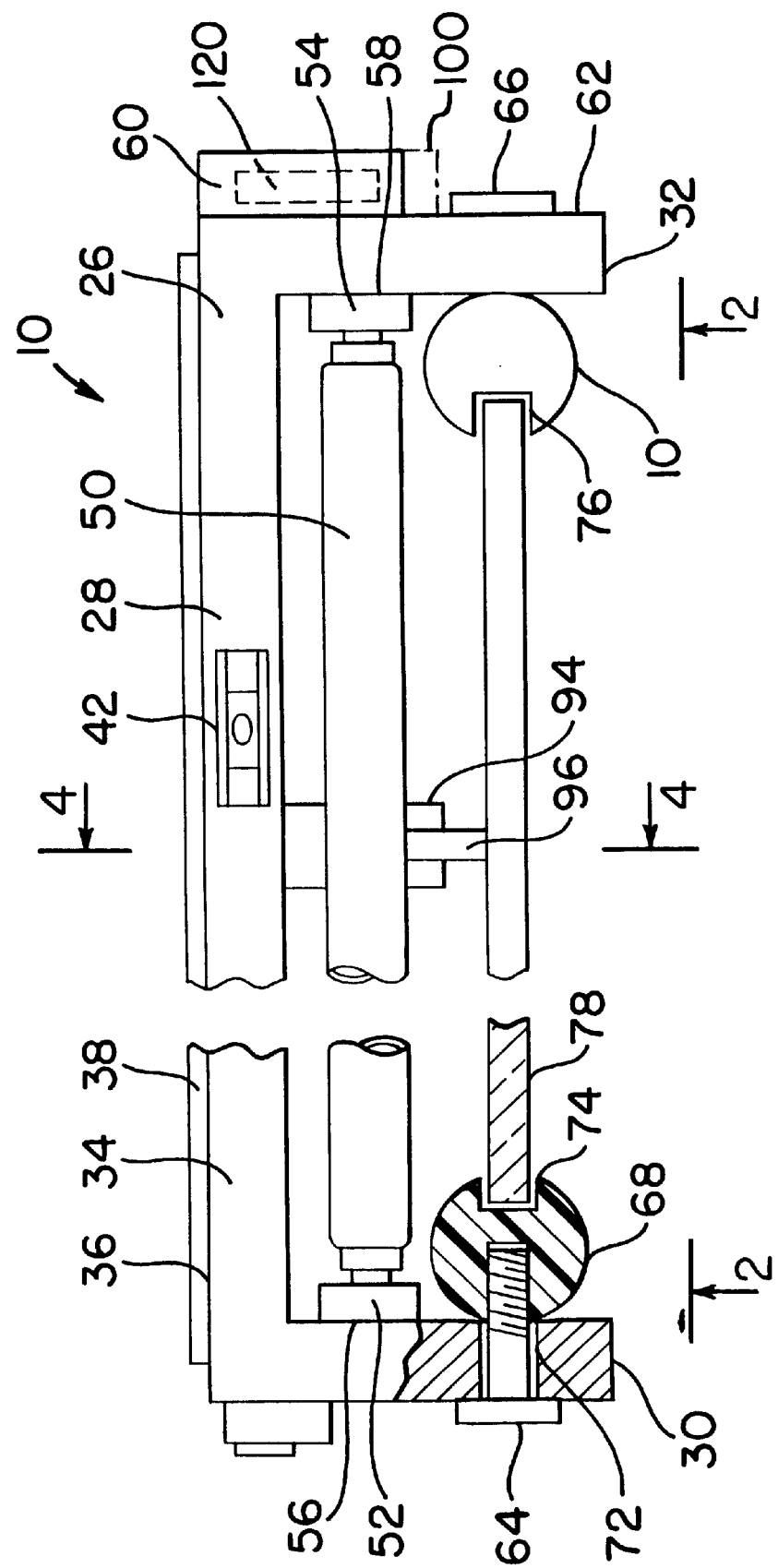
FIG. 1 is a top view of a guard for a press brake, made in accordance with the present invention with a portion of the guard shown in cross-section.

With reference to the drawings, wherein like reference numbers designate like or corresponding parts throughout, there is shown in FIGS. 1–5 a guard for a press brake 10 made in accordance with the present invention. The guard 10 is shown mounted on a press brake 12 which includes a movable ram 14 which supports a male die 16 and a fixed bed 18 which supports a female die 20.

Figure 2:
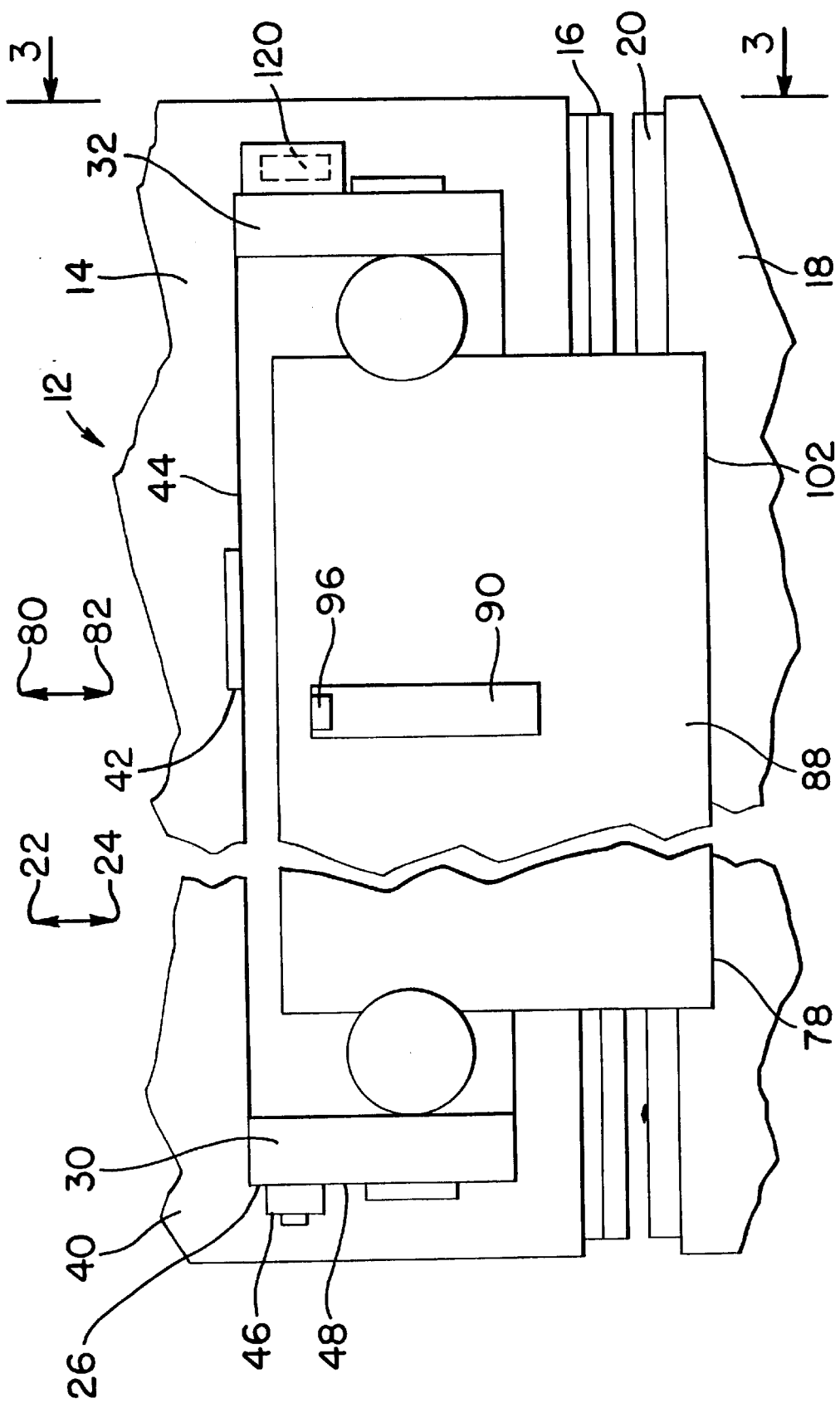
FIG. 2 is a front view of the guard of FIG. 1, taken along line 2—2 of FIG. 1, with the guard shown mounted on the movable ram of a press brake.
Figure 3:
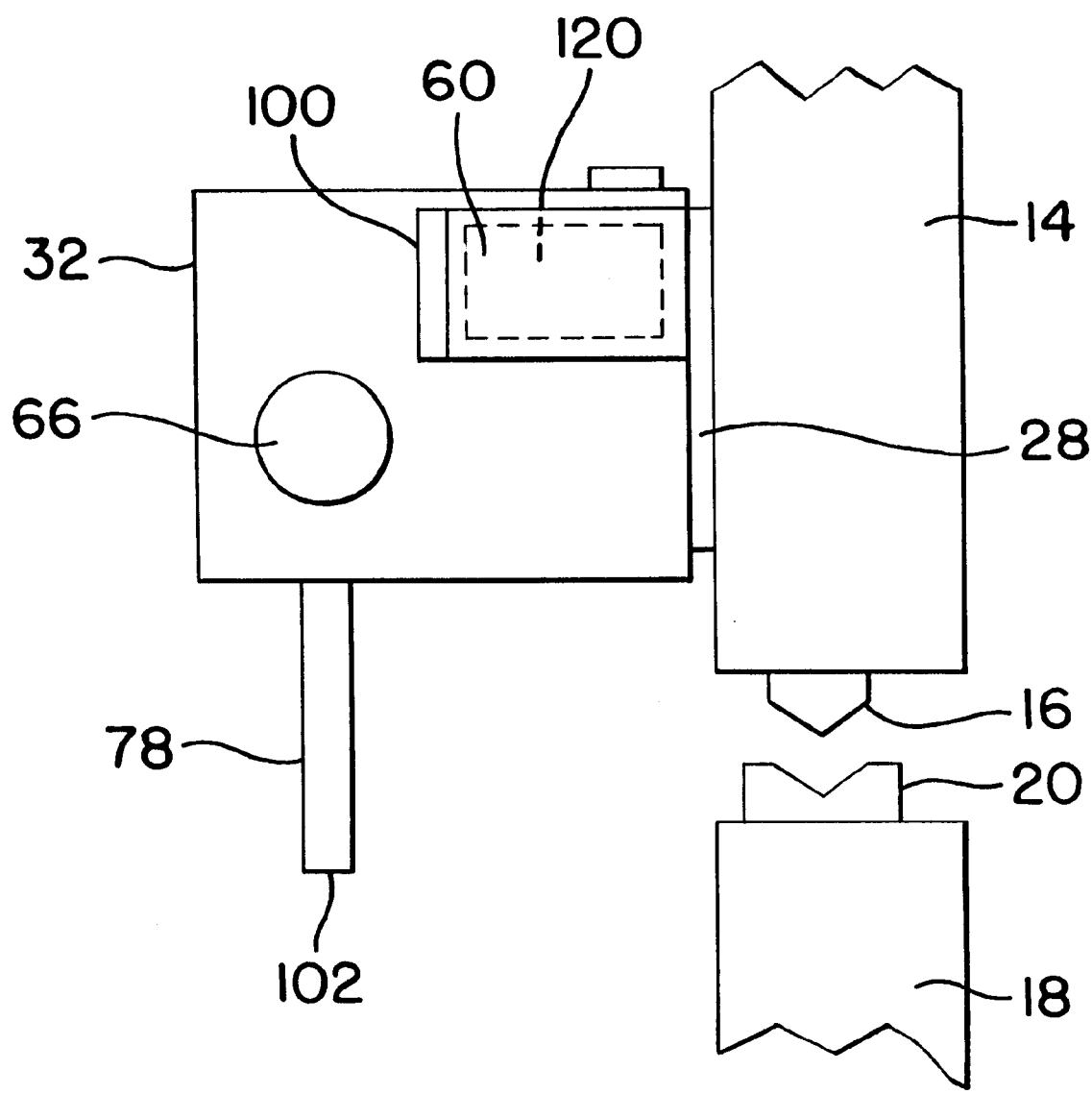
FIG. 3 is a side view taken along line 3—3 of FIG. 1.

Movable ram 14 moves in a vertical direction as indicated by the arrows 22, 24 in FIG. 2 to open and close male and female dies 16, 20 for the purpose of forming work pieces which are inserted between the dies 16, 20.

Guard 10 includes a housing 26 which has a back portion 28 and a pair of spaced apart side portions 30, 32 which project from the back portion 28. Back portion 28 has a front surface 34 and a rear surface 36. An electromagnet 38 is mounted on rear surface 36 for attachment of housing 26 to the surface 40 of movable ram 14.

A bubble level 42 is provided on the top surface 44 of the housing 26 for the purpose of ensuring that housing 26 is level during installation. An electrical switch 46 is mounted on the outer surface 48 of the side portion 30 for the purpose of energizing and de-energizing the electromagnet 38. A fluorescent light bulb 50 is mounted in receptacles 52, 54 which are positioned on inner surfaces 56, 58 of side portions 30, 32.

A junction box 60 is positioned on outer surface 62 of side portion 32 for electrical connection of the electromagnet 38 and the fluorescent light bulb 50 to a source of electrical power.

Alternatively, junction box 60 may contain batteries 120 for operation of the electromagnet 38 and the fluorescent light bulb 50 without a need for connection to a source of external electrical power.

Inner surfaces 56, 58 of side portions 30, 32 each have a swivel pin 64, 66 which supports a swivel ball 68, 70. The swivel pins 64, 66 project through clearance holes 72 formed in side portions 30, 32 and are threaded into swivel balls 68, 70, as shown in FIG. 1. Swivel balls 68, 70 each have a groove 74, 76 which provide a support for a guard plate 78 which can slide in the grooves 74, 76 in the directions shown by the arrows 80, 82 in FIGS. 2 and 5. Swivel balls 68, 70 also enable guard plate 78 to pivot in the direction shown by the arrows 84, 86 in FIG. 5.

Figure 4:
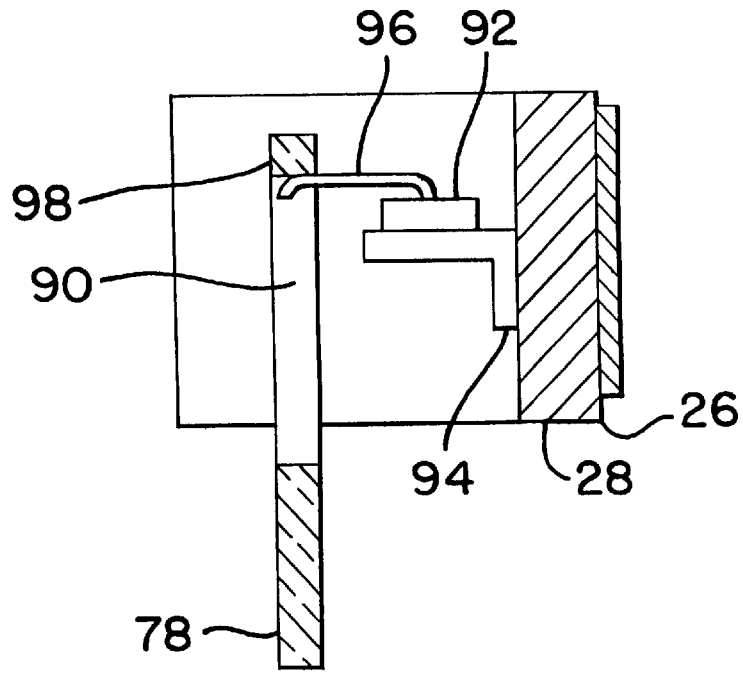
FIG. 4 is a cross-sectional view taken along line 4—4 of FIG. 1.
Figure 5:
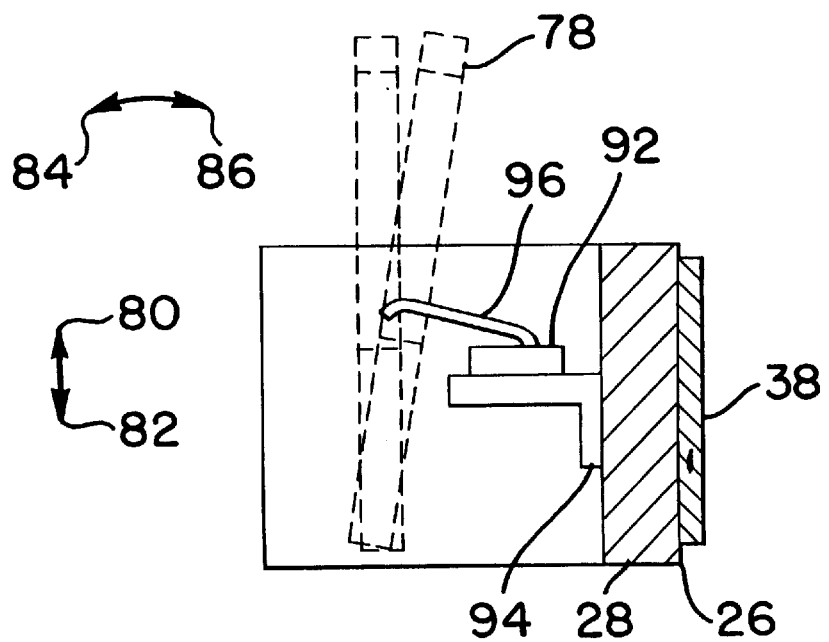
FIG. 5 is a cross-sectional view similar to FIG. 4 showing the guard plate in a raised position.

As is shown in FIG. 2, the central portion 88 of the guard plate 78 includes a generally rectangular aperture 90. A switch 92 is mounted on a bracket 94 which projects from the back 28 of the housing 26. The switch 92 includes a switch lever 96 which projects into the aperture 90 as is shown in FIG. 4. When guard plate 78 is in the lower position, as shown in FIGS. 2 and 4, the top edge 98 of the aperture 90 depresses the switch lever 96 and the switch 92 is turned off. When guard plate 78 is lifted or pivoted, as shown in FIG. 5, switch lever 96 is unloaded causing switch 92 to turn on, thereby turning the fluorescent light bulb 50 and audible alarm 100 on.

The audible alarm 100 is an alternative feature which may be incorporated to supplement the fluorescent light bulb 50. When guard plate 78 is released, it falls under the influence of gravity to the lower position shown in FIGS. 2 and 4, thereby again depressing switch lever 94 and turning fluorescent light bulb 50 and audible alarm 100 off.

As is shown in FIG. 2, the guard plate 78 covers the male and female dies 16, 20 and the lower edge 98 of the guard plate 78 extends below the female die 20. The guard plate 78 thus prevents accidental contact with the male and female dies 16, 20.

The guard plate 78 may preferably be made of a clear plastic such as is sold under the trademark LEXAN. The clear guard plate 78 enables the operator to monitor the action of the male and female dies 16, 20 while preventing accidental harmful contact.

During use, when an operator inserts a work piece between the male and female dies 16, 20, the work piece lifts or pivots the guard plate 78. This motion of the guard plate 78 causes the fluorescent light bulb 50 and the audible alarm 100 to turn on.

The visible and audible alarms 50, 100 attract and maintain the attention of the operator, thereby increasing the level of operator awareness and improving the safety level of the operation.

When the work piece is removed, the guard plate 78 falls back to the original position and thereby returns to the position in which the switch 92 turns the alarm off.

The foregoing specific embodiments of the present invention as set forth in the specification herein are for illustrative purposes only. Various deviations and modifications can be made within the spirit and scope of this invention, without departing from the main theme thereof.

I claim:

1. A guard for a press brake having a movable ram portion and a fixed bed portion comprising:

a housing;

housing mounting means for mounting said housing on said movable ram portion of said press brake;

guard plate means;

guard plate mounting means disposed on said housing for mounting said guard plate means, with said guard plate mounting means capable of allowing movement of said guard plate means responsive to introduction of a work piece between said movable ram portion and said fixed bed portion of said press brake;

switch means mounted on said housing, with said switch means disposed for actuation responsive to movement of said guard plate means;

switch actuation means mounted on said switch means for actuation of said switch means responsive to movement of said guard plate means;

alarm means mounted on said housing; and electrical connection means connecting said switch means and said alarm means for activation of said alarm means responsive to movement of said guard plate means.

2. A guard for a press brake according to claim 1, in which said housing mounting means comprises electromagnetic mounting means.

3. A guard for a press brake according to claim 1, in which said alarm means comprises an illuminated alarm.

4. A guard for a press brake according to claim 1, in which said alarm means comprises a fluorescent light.

5. A guard for a press brake according to claim 4, in which said fluorescent light extends between said spaced apart side portions.

6. A guard for a press brake according to claim 1, in which said alarm means comprises an audible alarm.

7. A guard for a press brake according to claim 1, in which said guard plate means comprises a clear plastic plate.

8. A guard for a press brake according to claim 1, in which said guard plate mounting means comprises sliding means capable of enabling sliding motion of said guard plate means relative to said housing.

9. A guard for a press brake according to claim 1, in which said guard plate mounting means comprises pivoting means capable of enabling pivoting motion of said guard plate means relative to said housing.

10. A guard for a press brake according to claim 1, in which said guard plate mounting means comprises combination sliding and pivoting means capable of enabling combination sliding and pivoting motion of said guard plate means relative to said housing.

11. A guard for a press brake according to claim 1, in which said alarm means comprises battery operated alarm means.

12. A guard for a press brake according to claim 1, in which said housing comprises a back portion and a pair of spaced apart side portions.

13. A guard for a press brake according to claim 12, in which said guard plate means further comprises an aperture portion.

14. A guard for a press brake according to claim 13, in which said switch means further comprises:

bracket means disposed projecting from said back portion of said housing;

electrical switch means, with said electrical switch means including actuating lever means, with said actuating lever means projecting into said aperture portion for actuation of said switch means responsive to motion of said guard plate means.

15. A guard for a press brake according to claim 12, in which said guard plate mounting means comprises guard plate mounting means disposed, one each, on said spaced apart side portions.

* * * * *